(12) United States Patent  (10) Patent No.: US 8,350,837 B2
Kuroda  (45) Date of Patent: Jan. 8, 2013

(54) POWER MONITORING AND CONTROL APPARATUS FOR DISPLAY DEVICE

(75) Inventor: Yasunori Kuroda, Kato (JP)

(73) Assignee: Fujitsu Limited, Kawasaki (JP)

( * ) Notice: Subject to any disclaimer, the term of this patent is extended or adjusted under 35 U.S.C. 154(b) by 1168 days.

(21) Appl. No.: 11/949,257

(22) Filed: Dec. 3, 2007

(65) Prior Publication Data

US 2008/0158216 A1   Jul. 3, 2008

(30) Foreign Application Priority Data

Dec. 28, 2006   (JP) ................... 2006-355434

(51) Int. Cl.
*G06F 3/038* (2006.01)
*G06F 13/14* (2006.01)
*G06F 13/20* (2006.01)
*G09G 3/36* (2006.01)

(52) U.S. Cl. ........ 345/211; 710/313; 713/320; 345/204; 345/520; 345/100

(58) Field of Classification Search .......... 345/211–213, 345/204, 520, 100; 713/300, 320; 323/384; 361/93.1, 93.9; 710/313
See application file for complete search history.

(56) References Cited

U.S. PATENT DOCUMENTS

| 5,485,341 | A | 1/1996 | Okado et al. |
|---|---|---|---|
| 6,181,030 | B1 * | 1/2001 | Carpenter et al. ............ 307/113 |
| 6,940,477 | B2 | 9/2005 | Moon et al. |
| 7,012,578 | B2 * | 3/2006 | Nakatsuka et al. ............ 345/52 |
| 7,075,586 | B2 | 7/2006 | McIntyre |
| 7,406,607 | B2 * | 7/2008 | Echizenya .................... 345/204 |
| 7,507,001 | B2 * | 3/2009 | Kit ............................... 362/276 |

FOREIGN PATENT DOCUMENTS

JP   2003-209920   7/2003
JP   2005-84116    3/2005

OTHER PUBLICATIONS

Taiwan Office Action issued Oct. 13, 2011 for corresponding Taiwan Patent Application No. 096143007.

* cited by examiner

*Primary Examiner* — Lun-Yi Lao
*Assistant Examiner* — Jarurat Suteerawongsa
(74) *Attorney, Agent, or Firm* — Staas & Halsey LLP

(57) ABSTRACT

A current detection unit that monitors changes in two types of voltage produced by the voltage control unit, and detects and abnormal current flowing due to a potential between the two types of the voltages at both ends of the voltage control unit and an HPG control that receives a control signal of a constant voltage supplied from the information processing device, and transmits a HPG signal to the information processing device based on the abnormal current detected by the current detection unit and the control signal, wherein the HPG signal is a signal indicating a supply state of the direct current power voltage.

9 Claims, 6 Drawing Sheets

_POWER MONITORING AND CONTROL APPARATUS FOR DISPLAY DEVICE_

CROSS-REFERENCE TO RELATED APPLICATION

This application is related to Japanese patent application No. 2006-355434 filed on 28 Dec. 2006, whose priority is claimed under 35 USC §119, the disclosure of which is incorporated by reference in its entirety.

BACKGROUND OF THE INVENTION

1. Field of the Invention

The present invention relates to power monitoring and control apparatuses for display devices, and in particular, to a power monitoring and control apparatus for a display device that protects a power supply circuit element by detecting a malfunction in power supplied to the display device when the display device and an information processing device are connected via a DVI interface.

2. Description of the Related Art

Today, a digital DVI (Digital Visual Interface) is employed in addition to an analog RGB interface as an interface for connecting a display device such as an LCD (hereinafter also referred to as a monitor) and an information processing device such as a personal computer (hereinafter also referred to as PC).

In the DVI, mainly, three standardized signals (a TMDS signal and a clock, a DDC signal and a clock, and a hot plug signal) are transmitted. Among these signals, the TMDS signal and a clock thereof with which video signals are transmitted at a high speed are generated by a supply voltage (+3.3 V) on a side of the PC, and an impedance thereof matches an impedance of the supply voltage on a side of the monitor.

FIG. 6 shows a circuit block diagram of a portion relating to power monitoring of a conventional display device.

In the drawing, an essential configuration of a portion relating to a DVI 30 between a monitor 10 and a PC 20 is illustrated. The monitor 10 mainly includes a power plug 4 connected to a commercial power source (AC 100 V) 40, an AC/DC conversion unit 1 that converts an alternating voltage 100 V inputted from the power plug 4 into a direct voltage, a REG 2 that supplies +3.3 V to a receiver 3, and the receiver 3 that receives a group of TMDS signals.

The DVI 30 which is an interface between the monitor 10 and the PC 20 mainly includes a group for transmitting the TMDS signal, a group for transmitting the DDC signal, and a hotplug (HPG) signal.

The group of the TMDS (Transition Minimized Differential Signaling) includes a video signal and a clock signal, and is transmitted from a signal transmission unit 21 of the PC 20 to the receiver 3.

The group of the DDC (Display Data Channel) includes a DDC data signal and a direct current signal of +5 V (DDC +5 V), and is transmitted from a DDC transmission unit 22 of the PC 20 to the monitor 10.

The hotplug (HPG) signal is a signal that enables plugging in and out of an interface cable while the power of the monitor is on, and is transmitted from the monitor 10 to a hotplug detection unit 23 of the PC 20 along with DDC +5 V.

The TMDS signal transmitted from the signal transmission unit 21 is generated by the supply voltage (+3.3 V) on the side of the PC 20, and its impedance matches the impedance of the supply voltage of +3.3 V supplied to the receiver 3 on the side of the monitor 10.

Further, the monitor 10 is provided with a circuit block for generating the hotplug (HPG) signal from the DDC +5 V signal. This circuit block is includes transistors (T1 and T2) and a group of resistances (R1 to R5).

When DDC +5 V is supplied from the PC 20 to the side of the monitor 10 to supply the supply voltage +3.3 V on the side of the monitor 10, the hotplug HPG signal is in a HIGH state at +5 V via the resistance R3. The hotplug detection unit 23 determines that the monitor is in a power supplied state when detecting that the HPG signal is HIGH.

On the other hand, if the power plug 4 of the monitor 10 is unplugged while both of the monitor 10 and the PC 20 are in the power supplied state, the voltages of +5 V and +3.3 V supplied to the REG 2 and the receiver 3 of the monitor stop and decrease to 0 V. In this case, since the voltage of +3.3 V is still being applied to the signal transmission unit 21 on the side of the PC 20, a potential difference is generated between the signal transmission unit 21 on the side of the PC and the receiver 3 on the side of the monitor.

Therefore, an abnormal current over the rated current flows from the signal transmission unit 21 of the PC 20 via the DVI 30 to the receiver 3 of the monitor 10. Because of this abnormal current, there is a case in which a circuit element that constitutes such as the receiver 3 or the signal transmission unit 21 is destroyed (see Japanese Unexamined Patent Publication No. 2003-209920, for example).

According to power monitoring of the conventional display device, in order to reduce the flow of the abnormal current over the rated current, the impedance of the signal transmission unit 21 is controlled using the hotplug HPG signal. An interface control unit 24 of the PC 20 is a portion for controlling the impedance of the signal transmission unit 21 in response to the hotplug HPG signal.

When the supply voltage of +3.3 V on the side of the monitor 10 is being supplied, the hotplug detection unit 23 detects that the HPG signal is in the HIGH state, the interface control unit 24 allows the signal transmission unit 21 to transmit a display signal.

On the other hand, when the power plug 4 of the monitor 10 is unplugged and the voltage of +3.3 V on the side of the monitor is not supplied, the transistor T2 is turned OFF and the HPG signal becomes LOW.

When the hotplug detection unit 23 detects that the HPG signal becomes LOW, the interface control unit 24 controls so that the DVI 30 connected to the signal transmission unit 21 becomes a high impedance.

By control such that the abnormal current does not flow from the PC 20 to the monitor 10, it is intended to protect devices of the receiver.

However, when the TMDS signal becomes high impedance merely based on change of the state of the HPG signal from HIGH to LOW, there still remains the potential difference between the signal transmission unit 21 and the receiver 3, and setting of a detection voltage of the receiver 3 is difficult due to such as a hysteresis and a threshold value of a base voltage of the transistor T2.

Further, in order to avoid such a difficulty in setting, it is generally designed so that the supply of the power of +3.3 V on the side of the monitor 10 is kept as it is even when a power button is pressed to perform a power-off operation. In other words, because the power supply of +3.3 V on the side of the monitor 10 is maintained even when a user performs the power-off operation, power is consumed even while unused, and therefore it is not compliant with a trend of energy conservation.

On the other hand, the most effective way to meet the recent demand for energy conservation is to stop the power supply of +3.3 V on the side of the monitor when performing a power-off operation. Further, in order to protect the devices such as the receiver, it is required to reduce the flow to the monitor of the abnormal current as described above immediately after the supply of +3.3 V is stopped.

SUMMARY OF THE INVENTION

An apparatus of this invention is a power monitoring and control apparatus for a display device capable of protecting the display device and a device at an interface portion of an information processing device when power supply to the display device is stopped, as well as reducing power consumption of the display device to realize energy conservation.

The present invention provides a power monitoring and control apparatus for a display device, the apparatus including: a signal receiving unit that receives a display signal from a information processing device; a power conversion unit that converts alternating current power into direct current power; a voltage control unit that produces a desired direct voltage based on the direct current power; a current detection unit that monitors changes in two types of voltages produced by the voltage control unit, and detects an abnormal current flowing due to a potential difference between the two types of the voltages at both ends of the voltage control unit; and an HPG control unit that receives a control signal of a constant voltage supplied from the information processing device, and transmits a HPG signal to the information processing device based on the abnormal current detected by the current detection unit and the control signal, wherein the HPG signal is a signal indicating a supply state of the direct current power voltage.

Accordingly, it is possible to prevent a circuit element from being destroyed due to the abnormal current flowing in from the information processing device when the direct voltage is stopped, and particularly protect the circuit element of a signal receiving unit.

DESCRIPTION OF THE PREFERRED EMBODIMENTS

In the present invention, when the current detection unit detects the abnormal current, the HPG control unit transmits a first HPG signal. The first HPG signal is a signal indicating that supply of the direct current power voltage is stopped. When the current detection unit detects no abnormal current, the HPG control unit transmits a second HPG signal indicating that the direct current power voltage is supplied.

In the present invention, the abnormal current designates a current that does not flow in a normal transmission state of a display signal, and that does not contribute to transmission of intended display signals. In examples described later, the abnormal current corresponds to a current I1 shown in FIG. 2.

Further, two types of voltages that are generated in a voltage control unit designate +5V and +3.3 V in the following examples.

A direct current signal of 0 V may be used as the first HPG signal, and a direct current signal of +5 V may be used as the second HPG signal.

In the present invention, when the first HPG signal is transmitted to the information processing device, control by the information processing device prevents the abnormal current from flowing into the signal receiving unit.

Further, the present invention provides the power monitoring and control apparatus further including: a switch that controls supply of the direct voltage to the voltage control unit; and a switch control unit that controls on and off of a switch, wherein when the switch is controlled to be turned on by the switch control unit, the HPG control unit transmits the HPG signal to the information processing device. The HPG signal is a signal indicating that supply of the direct current power voltage is stopped.

An FET switch may be used as the switch.

A photocoupler may be used as the current detection unit.

The display signal, the control signal, and the HPG signal are transmitted via a DVI cable connecting the display device and the information processing device.

Further, the control signal of DDC +5 V is used.

The following describes embodiments of the present invention with reference to the drawings. It should be noted that the following description of examples are not intended to limit the present invention.

Configuration of Power Monitoring and Control Apparatus

Figure 1:
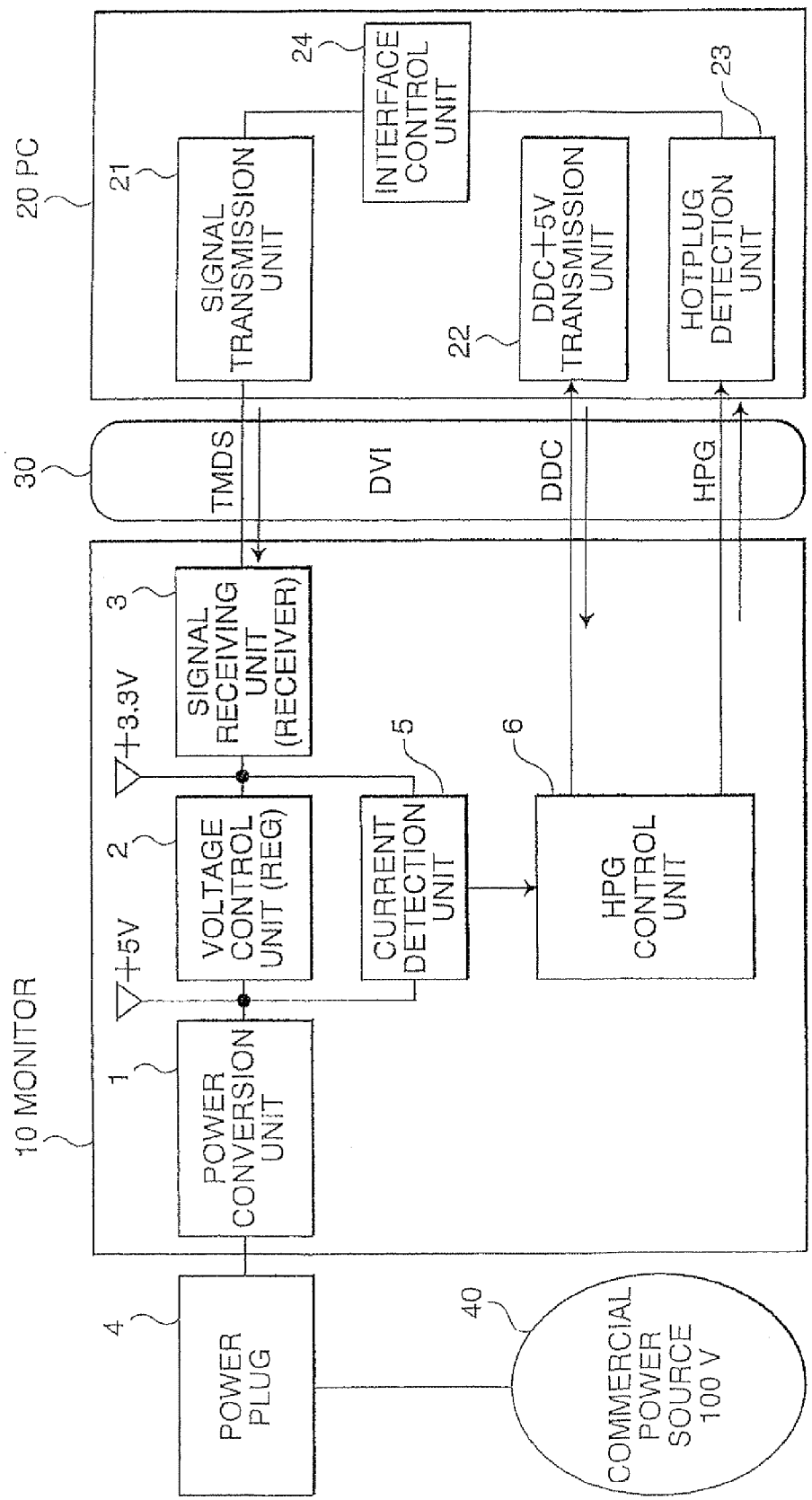
FIG. 1 is a block diagram showing a configuration of a power monitoring and control apparatus according to the present invention.

FIG. 1 shows a block diagram illustrating a configuration of a power monitoring and control apparatus of one example according to the present invention.

FIG. 1 mainly illustrates a portion relating to monitoring and controlling of power of a display device, at which a display device (monitor) 10 and an information processing device (PC) 20 are connected.

In the present invention, the power monitoring and control apparatus is incorporated in the display device (monitor) 10. Further, the display device (monitor) 10 and the information processing device (PC) 20 are connected by a DVI cable based on the DVI standard. Through this DVI cable, a display signal (TMDS signal), a control signal (DDC signal, DDC +5 V), and a HPG signal are transmitted.

The monitor 10 is connected to a commercial power source (AC 100V) 40 via a power plug 4.

An alternating current power voltage of AC 100V to be inputted is converted into a direct current power at a power conversion unit 1, and DC +5 V, for example, is generated.

Further, a voltage control unit (REG) 2 produces DC +3.3 V.

A signal receiving unit (receiver) 3 is a portion for receiving signals of a TMDS group transmitted from a side of the PC 20 via a DVI 30.

A current detection unit 5 is a portion for detecting the abnormal current that flows to the power conversion unit 1 from a side of the receiver 3, when supply of DC +5 V or DC +3.3 V stops. For example, a photocoupler that is described later corresponds to this portion.

A HPG control unit 6 receives a DDC +5 V signal as a control signal transmitted from the PC 20 via the DVI 30. The HPG control unit 6 is a portion for controlling the hotplug (HPG) signal based on this signal (DDC +5V) and a detection signal supplied form the current detection unit 5. For example, when no abnormal current is detected by the current detection unit 5, the HPG signal is considered to be in a HIGH state, and transmitted to the PC 20.

The fact that the HPG signal is in the HIGH state indicates that the monitor 10 is supplied with the direct voltage as usual. The HPG signal in the HIGH state corresponds to a second HPG signal, and is, for example, a direct current signal of +5 V.

Further, when the abnormal current is detected by the current detection unit 5, the HPG signal is considered to be in a LOW state, and transmitted to the PC 20. When the HPG signal is in the LOW state, by an interface control unit 24 on the side of the PC 20, an output portion from the DVI 30 of a signal transmission unit 21 becomes high impedance. The fact that the HPG signal is in the LOW state indicates that supply of the direct current power voltage is stopped or not in a normal supply state on the side of the monitor 10. The HPG signal in the LOW state corresponds to a first HPG signal, and is, for example, a direct current signal of 0 V.

Figure 6:
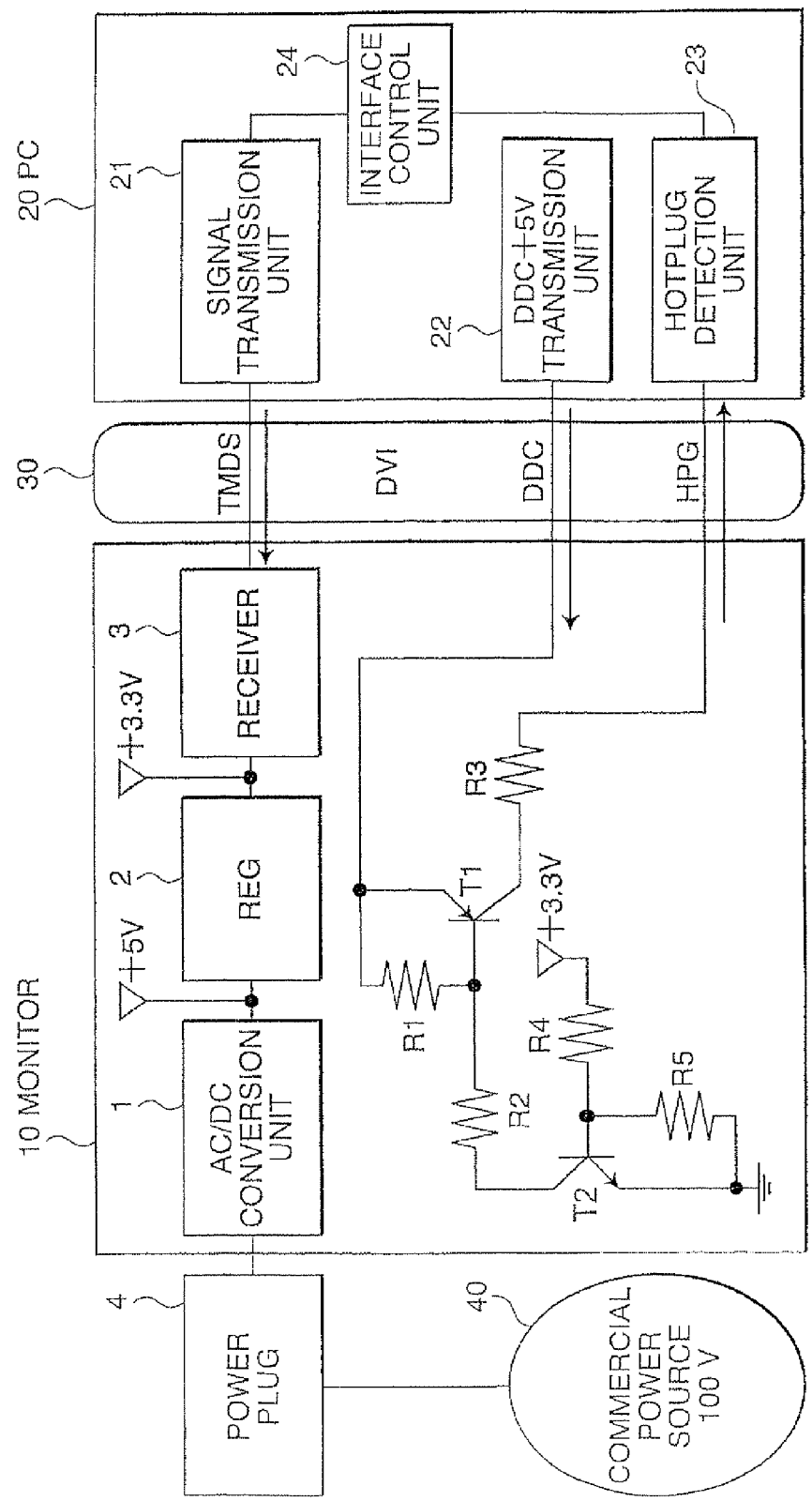
FIG. 6 is a partial circuit block diagram of conventional power monitoring and control.

The signals that flow via the DVI 30 (TMDS, DDC, and HPG) and the configuration of the side of the PC 20 are the same as the conventional configuration blocks as shown in FIG. 6.

As shown in FIG. 1 described in the above, according to the present invention, the current detection unit 5 is provided on the side of the monitor 10, and "HIGH" and "LOW" states of the hotplug HPG signal are controlled based on the detection signal outputted from the current detection unit 5 in addition to DDC +5 V.

With the above configuration, it is possible to quickly detect the abnormal current when direct current power (+5 V and +3.3 V) on the side of the monitor 10 is decreased. Further, by transmitting to the PC 20 that the direct current power on the side of the monitor is decreased or stopped, the signal transmission unit 21 on the side of the PC 20 becomes high impedance to protect circuit devices of the signal transmission unit 21 and the receiver 3.

Example 1 of the Present Invention

Figure 2:
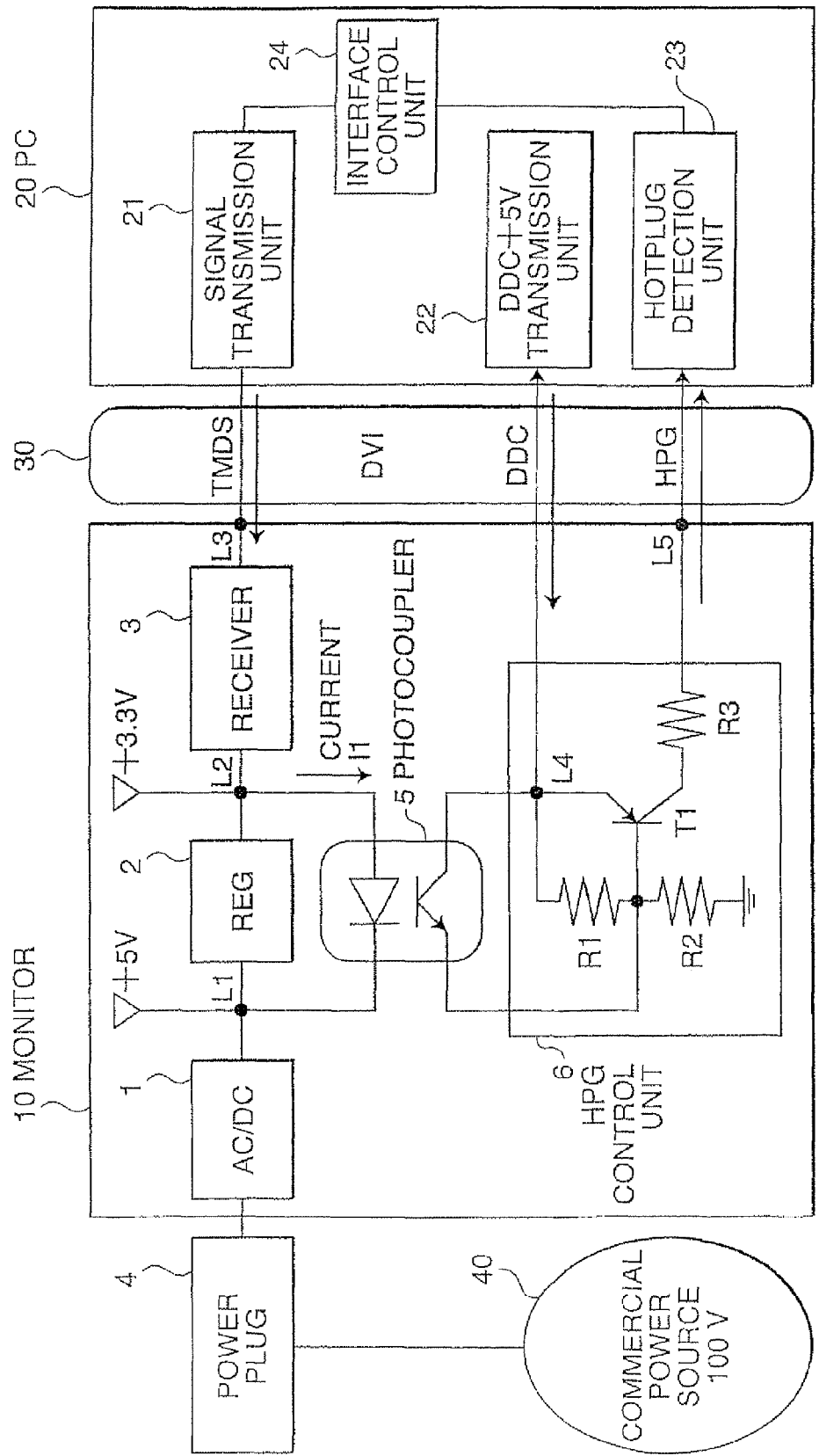
FIG. 2 is a block diagram showing a configuration of Example 1 according to the present invention.

FIG. 2 illustrates a block diagram showing a configuration of Example 1 according to the present invention.

In FIG. 2, an AC/DOC 1 is an AC-DC converter, and corresponds to the power conversion unit 1 that converts an AC power to a DC power. A REG 2 corresponds to a voltage control unit 2, and a receiver 3 corresponds to the signal receiving unit 3.

Further, a photocoupler 5 corresponds to the current detection unit 5 and detects the abnormal current I1 that flows from a point L2 to a point L1 in FIG. 2. A diode of the photocoupler 5 is connected with a direction from the point L2 to the point L1 as a forward direction, and allows a current that flows only from the point L2 to the point L1. That is, a current that flows in a backward direction (from the point L1 to the point L2) is not detected.

When the current I1 over a predetermined value flows through the diode of the photocoupler 5, the current flows through a transistor portion in the photocoupler 5, and a voltage in a circuit that corresponds to the HPG control unit 6 changes.

Further, in FIG. 2, the portion corresponding to the HPG control unit 6 includes three resistances (R1 to R3) and one transistor T1.

A point L4 of the HPG control unit 6 is connected to an emitter portion of the photocoupler and a DDC +5 input terminal of the DVI 30, and is normally constant at +5 V when the PC 20 is in a connecting state.

Further, a point L5 on one side of the resistance R3 of the HPG control unit 6 is connected to an HPG signal output terminal of the DVI 30.

When the photocoupler 5 is in a so-called OFF state, the transistor T1 is also in the OFF state, and the point L5 on the left side of the resistance R3 is in the HIGH state (+5 V). At this time, the HPG signal is outputted in the HIGH state (+5 V).

Further, if the photocoupler 5 is turned to an ON state because the current I1 flows, when the current flows to the resistance R3 because the transistor T1 also becomes the ON state, the point L5 becomes in the LOW state (0 v). That is, the HPG signal is outputted in the LOW state.

In FIG. 2, suppose that the power plug 4 is unplugged, and the power supply from the commercial power source stops. Also suppose that the PC is still turned on, the power on the side of the PC 20 remains being supplied.

Figure 4:
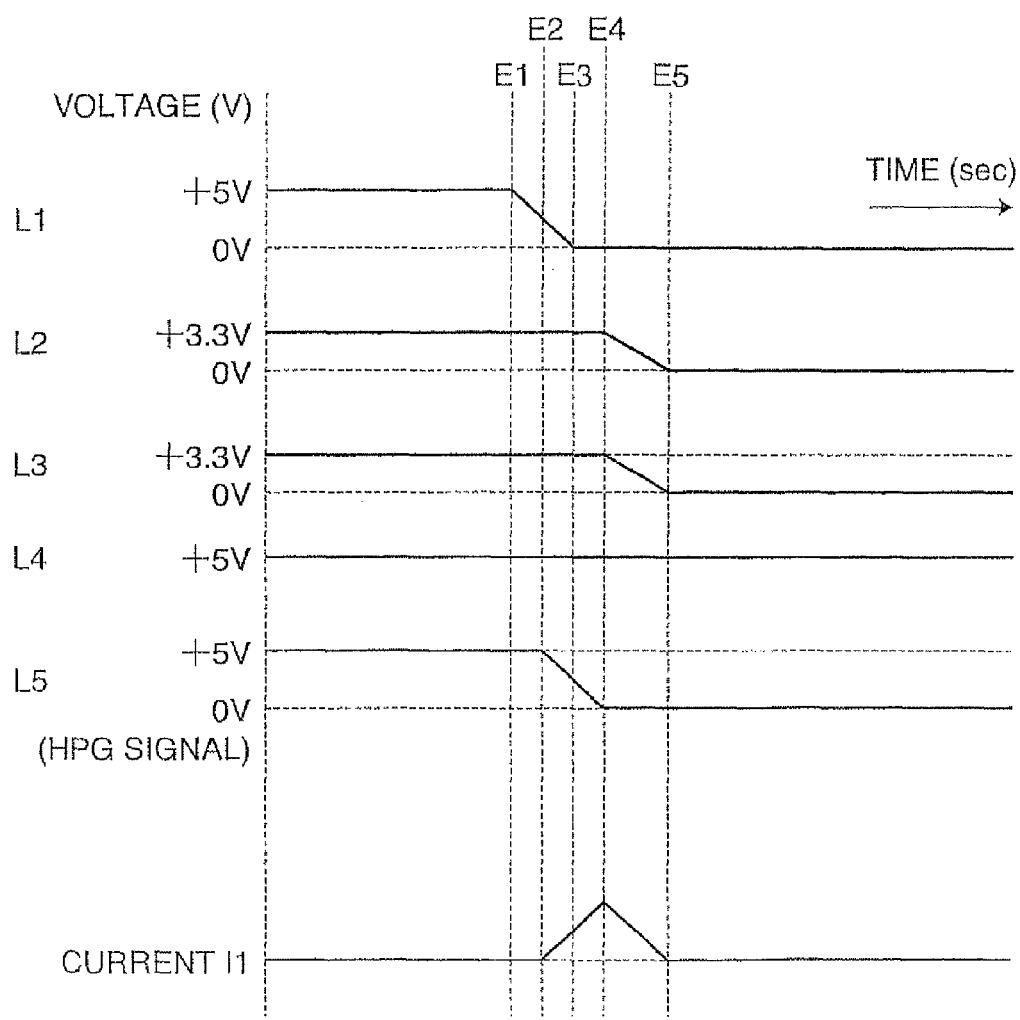
FIG. 4 is a time chart of the power monitoring and control in Example 1 according to the present invention.

FIG. 4 shows a time chart in the case in which such a change in the power supply occurs in Example 1.

FIG. 4, voltages at points L1 to L5 are shown in FIG. 2. When the commercial power source is supplied to the monitor 10, potentials at the points L1 to L5 are respectively +5 V, +3.3 V, +3.3 V, +5 V, and +5 V.

At this time, +5 V and +3.3 V are respectively applied at the point L1 and the point L2, and a potential difference in the backward direction is generated in the diode of the photocoupler 5. Consequently, the current I1 does not flow to the photocoupler 5. Therefore, as shown in the left end in the time chart in FIG. 4, the current I1 is zero, the potential at the point L5 is +5 V, and the HPG signal is in the HIGH state.

Suppose that the power plug 4 is unplugged at a timing E1 in FIG. 4. Then the potential at the point L1 decreases from the timing E1 to a timing E3 down to 0 V in a short period of time.

Further, following the change of the voltage at the point L1 (5 V to 0 V), after a slight delay in time, the potential at the point L2 also decreases from +3.3 V to 0 V from a timing E4 to a timing E5.

Because a voltage in the forward direction is applied to the diode of the photocoupler 5 from a time when the potential at the point L1 gradually decreases from +5 V and becomes lower than +3.3 V (timing E2), the current I1 starts to flow as shown in FIG. 2.

The current I1 starts to increase gradually from the timing E2, and peaks at the timing E4 when the voltage at the point L2 (+3.3 V) starts to decrease. After that, the current I1 gradually decreases down to zero at the timing E5.

Due to the above described change in the current I1, the transistor T1 is turned to the ON state, the potential at the point L5 changes from +5 V (HIGH) to 0 V (LOW).

In other words, because of the flow of the potential I1, the HPG signal outputted from the point L5 changes from HIGH to LOW.

A hotplug detection unit 23 of the PC 20 detects that the HPG signal is in the LOW state.

The hotplug detection unit 23 transmits to the interface control unit 24 that the HPG signal is in the LOW state.

When receiving that the HPG signal is in the LOW state, the interface control unit 24 recognizes that the power on the side of the monitor 10 is turned off, and sets the signal transmission unit 21 to a high impedance in order to prevent the abnormal current from flowing any more to the point L3 via the DVI 30.

Control to set the signal transmission unit 21 to the high impedance is, for example, to maximize a resistance value of an interface cable.

Setting an output terminal portion of the signal transmission unit 21 to a high impedance state prevents the TMDS signal from being outputted, and the potential at the point L3 at the timing E5 in FIG. 4 becomes 0 V. Specifically, due to control from the side of the PC, the potential at the interface portion with the PC becomes 0 V, and therefore it is possible to prevent the abnormal current from flowing into the signal receiving unit (receiver) 3.

As described above, because the photocoupler detects the abnormal current, when the power supply stops on the side of the monitor, it is possible to prevent the abnormal current above the rated current from flowing into the receiver 3 and the signal transmission unit 21, thereby protecting the circuit elements at those portions.

Example 2 of the Present Invention

Figure 3:
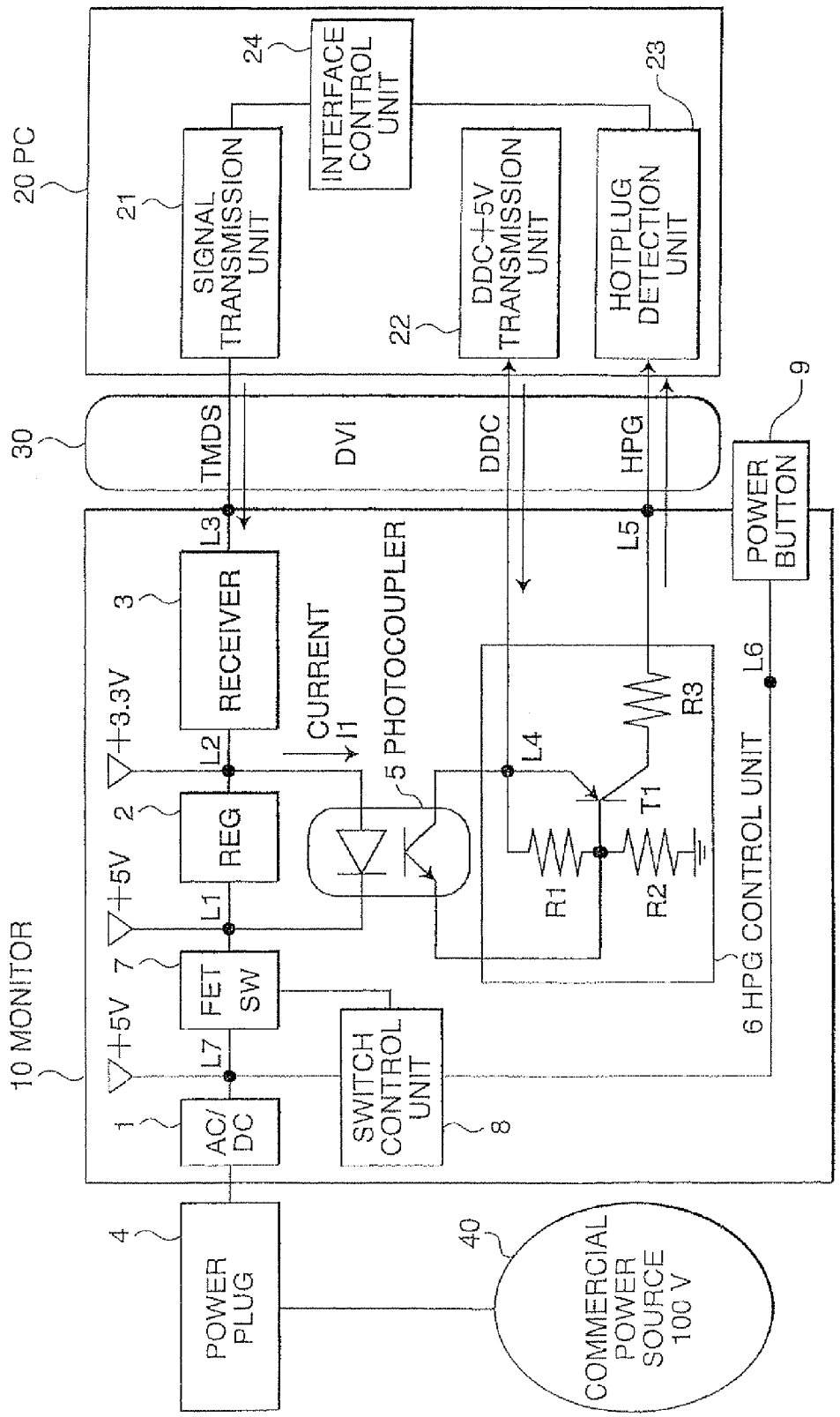
FIG. 3 is a block diagram showing a configuration of Example 2 according to the present invention.

FIG. 3 illustrates a block diagram showing a configuration of Example 2 according to the present invention.

An example is described in which a user manually disconnects power of the DC +5 V power source by means of a power button 9 of the monitor 10.

In FIG. 3, an FET switch (SW) 7, a switch control unit 8, and the power button 9 are further provided in addition to the configuration shown in FIG. 2.

The switch control unit 8 is a portion for controlling on and off the FET switch in response to on and off operations with the power button 9.

For example, when the power button 9 is turned ON, the FET switch (SW) 7 is turned ON, and the points 1 and 7 in FIG. 3 are electrically connected.

In contrast, when the power button 9 is turned OFF, the FET switch (SW) 7 is turned OFF, and connection between the points 1 and 7 in FIG. 3 is disconnected.

When the connection between the points L1 and L7 is disconnected by the FIT switch 7, +5 V power is not supplied to the point L1, and the potential at the point L1 becomes zero. Consequently, by turning OFF the power button 9, +5 V power to the point L1 and +3.3 V power to the point L2 are stopped, and therefore, better power conservation can be realized.

Figure 5:
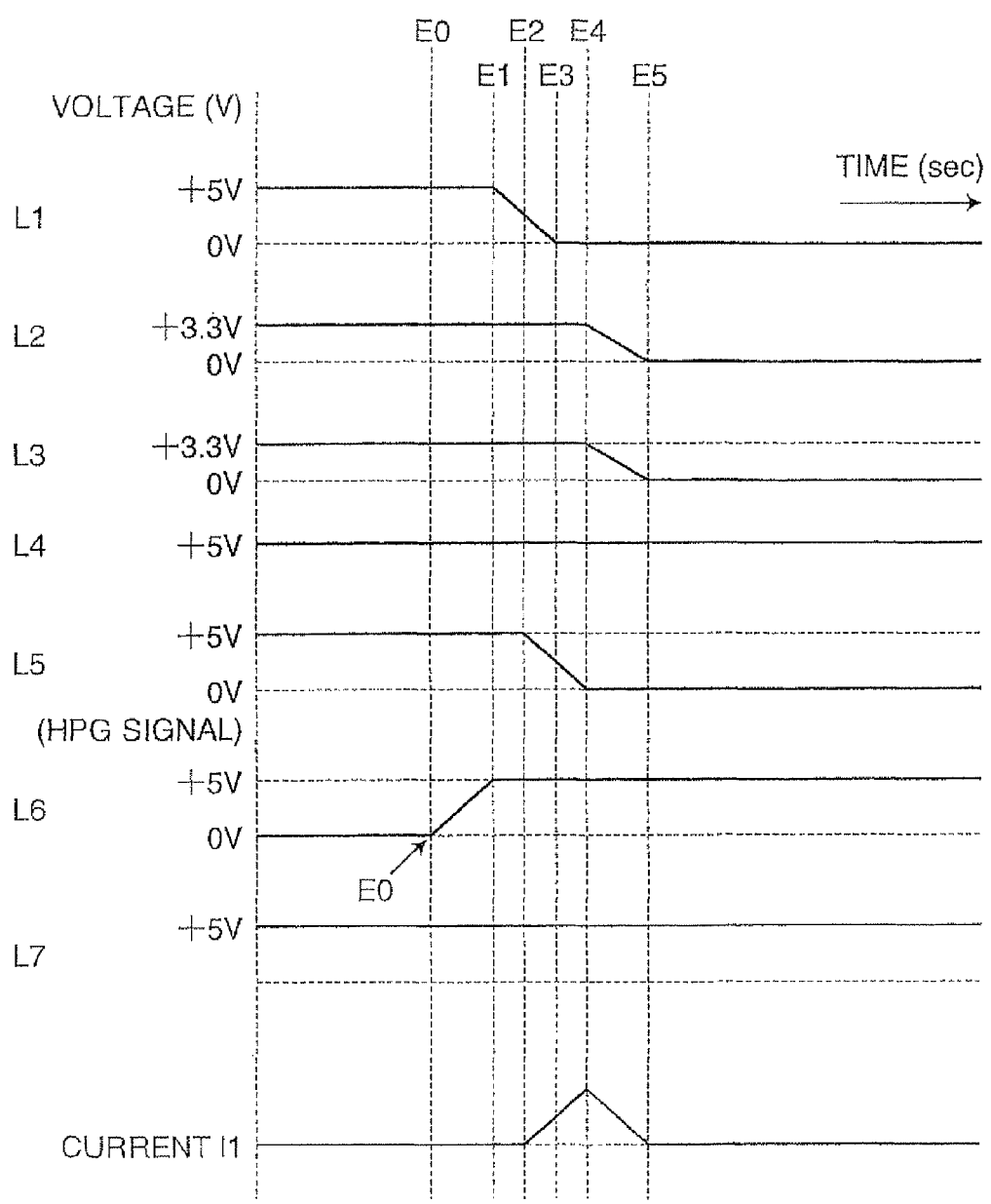
FIG. 5 is a time chart of the power monitoring and control in Example 2 according to the present invention.

FIG. 5 shows a time chart of change in power supply of Example 2 according to the present invention.

FIG. 5 indicates potentials at the points L6 and L7 in FIG. 3.

In FIG. 5, suppose that the power switch 9 is turned off at a timing E0.

In the off operation, the potential at the point L6 changes from 0 V to +5 V. When detecting that the power switch 9 is turned off at the timing E1, the switch control unit 8 controls the FIT switch 7 and disconnects between the points L7 and L1. That is, the connecting point of the FIT switch 7 is released.

Accordingly, +5 V supply in a direction from the point L7 to the point L1 stops, and the potential at the point L1 gradually decreases from the timing E1 to the timing E3 and becomes 0V at the timing E3.

When the potential at the point L1 goes below the potential at the point L2 (+3.3 V) at the timing E2 between the timing E1 and the timing E3, the abnormal current I1 starts to flow.

The following sequence in which the photocoupler 5 detects the abnormal current I1 to cause the potential at the point L5 to become zero and set the HPG signal to the LOW state is the same as in Example 1 as shown in FIG. 2 and FIG. 4.

Specifically, even when the power plug 4 remains plugged on the side of the monitor 10 but the user turns off the power button 9, the abnormal current I1 is detected by the photocoupler 5. Then, a DVI output terminal of the signal transmission unit 21 is set to a high impedance. Therefore, it is possible to protect the circuit elements of the receiver 3 and the signal transmission unit 21.

Further, when the user turns off the power button by the user's own will, DC power supply to the REG 2 and the receiver 3 stops to suppress power consumption.

According to the present invention, since the current detection unit that detects the abnormal current flowing through the voltage control unit, it is possible to prevent the circuit element from being destroyed due to the abnormal current flowing in from the information processing device when the voltage of the direct current power on the side of the display device is reduced or stopped.

What is claimed is:

1. A power monitoring and control apparatus for a display device, the apparatus comprising:
    a signal receiving unit that receives a display signal from an information processing device;
    a power conversion unit that converts alternating current power into direct current power;
    a voltage control unit that produces direct voltages based on the direct current power;
    a detection unit that detects whether or not a first potential is greater than a second potential, the first potential being a potential at a first point which the power conversion unit and the voltage control unit are connected at and a first power voltage is supplied to when an external power source and the power conversion unit are connected, the second potential being a potential at a second point which the voltage control unit and the signal receiving unit are connect at and a second power voltage is supplied to when the external power source and the power conversion unit are connected; and
    an HPG control unit that switches states of an HPG signal transmitted to the information processing device, between a first state of the HPG signal when the first potential is greater than the second potential and a second state when the first potential is equal or smaller than the second potential,
    wherein when the detection unit detects an abnormal current flowing due to a potential difference between the first power voltage and the second power voltage, the abnormal current flowing from the information processing device to the signal receiving unit when the direct current power is not supplied, and the abnormal current not contributing to transmission of the display signal, and
    the HPG control unit transmits a first HPG signal indicating that supply of the direct current power voltage is stopped; and when the detection unit detects no abnormal current, the HPG control unit transmits a second HPG signal indicating that the direct current power voltage is supplied.

2. The power monitoring and control apparatus according to claim 1, further comprising:
    a switch that controls supply of a direct current power to the voltage control unit; and
    a switch control unit that controls on and off of the switch, wherein
    when the switch is controlled to be turned on by the switch control unit, the HPG control unit transmits the HPG signal indicating that supply of the direct current power voltage is stopped to the information processing device.

3. The power monitoring and control apparatus according to claim 2, wherein the switch is an FET switch.

4. The power monitoring and control apparatus according to claim 1, wherein the first HPG signal is a direct current signal of 0 V, and the second HPG signal is a direct current signal of +5 V.

5. The power monitoring and control apparatus according to claim 1, wherein when the first HPG signal is transmitted to the information processing device, control by the information processing device prevents the abnormal current from flowing into the signal receiving unit.

6. The power monitoring and control apparatus according to claim 1, wherein the detection unit is a photocoupler.

7. The power monitoring and control apparatus according to claim 1, wherein the display signal, the control signal, and the HPG signal are transmitted via a DVI cable connecting the display device and the information processing device, and the control signal is of DDC +5 V.

8. An apparatus comprising:
a display device comprising:
   a signal receiving unit that receives a display signal from an information processing device;
   a power conversion unit that converts alternating current power into direct current power;
   a voltage control unit that produces a direct voltage based on the direct current power;
   a detection unit that detects whether or not a first potential is greater than a second potential, the first potential being a potential at a first point which the power conversion unit and the voltage control unit are connected at and a first power voltage is supplied to when an external power source and the power conversion unit are connected, the second potential being a potential at a second point which the voltage control unit and the signal receiving unit are connect at and a second power voltage is supplied to when the external power source and the power conversion unit are connected; and
   an HPG control unit that switches states of an HPG signal transmitted to the information processing device, between a first state of the HPG signal when the first potential is greater than the second potential and a second state when the first potential is equal or smaller than the second potential,
wherein when the detection unit detects an abnormal current flowing due to a potential difference between the first power voltage and the second power voltage, the abnormal current flowing from the information processing device to the signal receiving unit when the direct current power is not supplied, and the abnormal current not contributing to transmission of the display signal, and
the HPG control unit transmits a first HPG signal indicating that supply of the direct current power voltage is stopped; and when the detection unit detects no abnormal current, the HPG control unit transmits a second HPG signal indicating that the direct current power voltage is supplied.

9. An apparatus comprising:
a display device comprising:
   a signal receiving unit that receives a display signal from an information processing device;
   a power conversion unit that converts alternating current power into direct current power;
   a voltage control unit that produces a direct voltage based on the direct current power;
   means for detecting whether or not a first potential is greater than a second potential, the first potential being a potential at a first point which the power conversion unit and the voltage control unit are connected at and a first power voltage is supplied to when an external power source and the power conversion unit are connected, the second potential being a potential at a second point which the voltage control unit and the signal receiving unit are connect at and a second power voltage is supplied to when the external power source and the power conversion unit are connected; and
   an HPG control unit that switches states of receives an HPG signal transmitted to the information processing device, between a first state of the HPG signal when the first potential is greater than the second potential and a second state when the first potential is equal or smaller than the second potential,
wherein when the detection unit detects an abnormal current flowing due to a potential difference between the first power voltage and the second power voltage, the abnormal current flowing from the information processing device to the signal receiving unit when the direct current power is not supplied, and the abnormal current not contributing to transmission of the display signal, and
the HPG control unit transmits a first HPG signal indicating that supply of the direct current power voltage is stopped; and when the detection unit detects no abnormal current, the HPG control unit transmits a second HPG signal indicating that the direct current power voltage is supplied.

* * * * *

UNITED STATES PATENT AND TRADEMARK OFFICE
CERTIFICATE OF CORRECTION

PATENT NO. : 8,350,837 B2
APPLICATION NO. : 11/949257
DATED : January 8, 2013
INVENTOR(S) : Yasunori Kuroda It is certified that error appears in the above-identified patent and that said Letters Patent is hereby corrected as shown below:

In the Claims:

Column 10, Line 28, In Claim 9, after "of" delete "receives".

Signed and Sealed this
Seventh Day of May, 2013

Teresa Stanek Rea
*Acting Director of the United States Patent and Trademark Office*